United States Patent
Hunter et al.

(10) Patent No.: US 9,391,474 B2
(45) Date of Patent: Jul. 12, 2016

(54) POWER SUPPLY UNIT

(71) Applicant: IPS Group, Inc., San Diego, CA (US)

(72) Inventors: Stephen John Hunter, Randpark (ZA); Andre Malan Joubert, Edenvale (ZA)

(73) Assignee: IPS GROUP INC., San Diego, CA (US)

( * ) Notice: Subject to any disclaimer, the term of this patent is extended or adjusted under 35 U.S.C. 154(b) by 441 days.

(21) Appl. No.: 13/928,058

(22) Filed: Jun. 26, 2013

(65) Prior Publication Data
US 2013/0285455 A1    Oct. 31, 2013

Related U.S. Application Data

(63) Continuation of application No. 12/059,909, filed on Mar. 31, 2008.

(60) Provisional application No. 60/909,209, filed on Mar. 30, 2007.

(51) Int. Cl.
*H02J 9/06* (2006.01)
*H02J 7/00* (2006.01)

(52) U.S. Cl.
CPC ............. *H02J 9/06* (2013.01); *H02J 7/0044* (2013.01); *Y10T 307/625* (2015.04)

(58) Field of Classification Search
CPC .................................................... G07F 17/248
See application file for complete search history.

(56) References Cited

U.S. PATENT DOCUMENTS

| 2,161,046 A | 6/1939 | Hitzeman |
| 2,822,682 A | 2/1958 | Sollenberger |
| 2,832,506 A | 4/1958 | Hatcher |
| 2,988,191 A | 6/1961 | Grant |

(Continued)

FOREIGN PATENT DOCUMENTS

| CA | 2377010 | 10/2001 |
| CA | 2377010 | 12/2001 |

(Continued)

OTHER PUBLICATIONS

Predicting Capacitor Run Time for a Battery/Capacitor Hybrid Source, R.L. Spyker et al., Power Electronic Drives and Energy Systems for Industrial Growth, 1998. Proceedings. 1998 International Conference.*

(Continued)

*Primary Examiner* — Jared Fureman
*Assistant Examiner* — Joel Barnett
(74) *Attorney, Agent, or Firm* — Wilson, Sonsini, Goodrich & Rosati

(57) ABSTRACT

A power supply unit for supplying power to a device has a rechargeable, main battery; a charging arrangement for charging the main battery; a non-rechargeable back-up battery; load terminals for connection to a load; and a control unit for controlling supply of power to the load primarily from the main battery and secondarily from the back-up battery. The device is, in particular, a single bay, stand alone parking meter. In the event that the main battery runs low, the control unit is configured to supply power to the load from both the main battery and the back-up battery or only from the back-up battery. The back-up battery is easily replaceable, and the power supply unit has a bay, with connectors for receiving the back-up battery. The main battery is charged from solar panels. A communication device is provided to communicate status messages wirelessly to a control system.

24 Claims, 4 Drawing Sheets

(56) References Cited

U.S. PATENT DOCUMENTS

| | | | |
|---|---|---|---|
| 3,183,411 A | 5/1965 | Palfi | |
| 3,535,870 A | 10/1970 | Harold | |
| 3,721,463 A | 3/1973 | Attwood et al. | |
| 3,999,372 A | 12/1976 | Welch et al. | |
| 4,043,117 A | 8/1977 | Maresca et al. | |
| 4,812,805 A | 3/1989 | Lachat et al. | |
| 4,823,928 A | 4/1989 | Speas | |
| 4,825,425 A | 4/1989 | Turner | |
| 4,875,598 A | 10/1989 | Dahl | |
| 4,880,097 A | 11/1989 | Speas | |
| 4,895,238 A | 1/1990 | Speas | |
| 5,065,156 A * | 11/1991 | Bernier | G07F 17/24 340/309.16 |
| 5,222,076 A | 6/1993 | Ng et al. | |
| 5,244,070 A | 9/1993 | Carmen et al. | |
| 5,273,151 A | 12/1993 | Carmen et al. | |
| 5,360,095 A | 11/1994 | Speas | |
| 5,442,348 A * | 8/1995 | Mushell | G07F 17/246 194/205 |
| 5,471,139 A | 11/1995 | Zadoff | |
| 5,563,491 A | 10/1996 | Tseng | |
| 5,614,892 A | 3/1997 | Ward, II et al. | |
| 5,617,942 A | 4/1997 | Ward et al. | |
| 5,640,002 A | 6/1997 | Ruppert et al. | |
| 5,648,906 A | 7/1997 | Amirpanahi | |
| 5,659,306 A | 8/1997 | Bahar | |
| 5,710,743 A | 1/1998 | Dee et al. | |
| 5,737,710 A | 4/1998 | Anthonyson | |
| 5,777,951 A | 7/1998 | Mitschele et al. | |
| 5,778,067 A | 7/1998 | Jones et al. | |
| 5,806,651 A | 9/1998 | Carmen et al. | |
| 5,833,042 A | 11/1998 | Baitch et al. | |
| 5,841,369 A | 11/1998 | Sutton et al. | |
| 5,845,268 A | 12/1998 | Moore | |
| 5,852,411 A | 12/1998 | Jacobs et al. | |
| 5,954,182 A | 9/1999 | Wei | |
| 6,037,880 A | 3/2000 | Manion | |
| 6,078,272 A | 6/2000 | Jacobs et al. | |
| 6,081,205 A | 6/2000 | Williams | |
| 6,111,522 A | 8/2000 | Hiltz et al. | |
| 6,116,403 A | 9/2000 | Kiehl | |
| 6,195,015 B1 | 2/2001 | Jacobs et al. | |
| 6,229,455 B1 | 5/2001 | Yost et al. | |
| 6,230,868 B1 | 5/2001 | Tuxen et al. | |
| 6,309,098 B1 | 10/2001 | Wong | |
| 6,312,152 B2 | 11/2001 | Dee et al. | |
| RE37,531 E | 1/2002 | Chaco et al. | |
| 6,373,422 B1 | 4/2002 | Mostafa | |
| 6,456,491 B1 | 9/2002 | Flannery et al. | |
| 6,457,586 B2 | 10/2002 | Yasuda et al. | |
| 6,505,774 B1 * | 1/2003 | Fulcher | G06Q 30/0284 235/379 |
| 6,697,730 B2 | 2/2004 | Dickerson | |
| 6,747,575 B2 | 6/2004 | Chauvin et al. | |
| 6,856,922 B1 | 2/2005 | Austin et al. | |
| 6,914,411 B2 | 7/2005 | Couch et al. | |
| 6,929,179 B2 | 8/2005 | Fulcher et al. | |
| 7,019,420 B2 | 3/2006 | Kogan et al. | |
| 7,027,773 B1 | 4/2006 | McMillin | |
| 7,183,999 B2 | 2/2007 | Matthews et al. | |
| 7,222,031 B2 | 5/2007 | Heatley | |
| 7,237,716 B2 | 7/2007 | Silberberg | |
| 7,388,349 B2 * | 6/2008 | Elder | B60L 3/0046 307/10.6 |
| 7,748,620 B2 | 7/2010 | Gomez et al. | |
| 7,772,720 B2 | 8/2010 | McGee et al. | |
| 7,806,248 B2 | 10/2010 | Hunter et al. | |
| 7,854,310 B2 | 12/2010 | King et al. | |
| 7,855,661 B2 | 12/2010 | Ponert | |
| 7,933,841 B2 | 4/2011 | Schmeyer et al. | |
| 8,138,950 B1 | 3/2012 | Leung | |
| 8,395,532 B2 | 3/2013 | Chauvin et al. | |
| 8,479,909 B2 | 7/2013 | King et al. | |
| 8,513,832 B2 | 8/2013 | Hunter et al. | |
| 8,566,159 B2 | 10/2013 | King et al. | |
| 8,590,687 B2 | 11/2013 | King et al. | |
| 8,595,054 B2 | 11/2013 | King et al. | |
| 8,684,158 B2 | 4/2014 | Jones et al. | |
| 8,749,403 B2 | 6/2014 | King et al. | |
| 8,770,371 B2 | 7/2014 | Mackay et al. | |
| 8,862,494 B2 | 10/2014 | King et al. | |
| 9,047,712 B2 | 6/2015 | King et al. | |
| 2001/0012241 A1 | 8/2001 | Dee et al. | |
| 2001/0047278 A1 | 11/2001 | Brookner et al. | |
| 2001/0051531 A1 | 12/2001 | Singhal et al. | |
| 2002/0008639 A1 | 1/2002 | Dee et al. | |
| 2002/0111768 A1 | 8/2002 | Ghorayeb et al. | |
| 2003/0092387 A1 | 5/2003 | Hjelmvik | |
| 2003/0112597 A1 | 6/2003 | Smith | |
| 2003/0121754 A1 | 7/2003 | King | |
| 2003/0128010 A1 | 7/2003 | Hsu | |
| 2003/0128136 A1 | 7/2003 | Spier et al. | |
| 2003/0132840 A1 | 7/2003 | Bahar | |
| 2003/0140531 A1 | 7/2003 | Pippins | |
| 2003/0144972 A1 | 7/2003 | Cordery et al. | |
| 2003/0169183 A1 | 9/2003 | Korepanov et al. | |
| 2003/0179107 A1 | 9/2003 | Kibria et al. | |
| 2003/0220835 A1 | 11/2003 | Barnes | |
| 2003/0222792 A1 | 12/2003 | Berman et al. | |
| 2004/0068434 A1 | 4/2004 | Kanekon | |
| 2004/0084278 A1 | 5/2004 | Harris et al. | |
| 2004/0094619 A1 | 5/2004 | Silberg | |
| 2004/0181496 A1 | 9/2004 | Odinotski et al. | |
| 2004/0264302 A1 | 12/2004 | Ward | |
| 2005/0040951 A1 | 2/2005 | Zalewski et al. | |
| 2005/0178639 A1 | 8/2005 | Brumfield et al. | |
| 2005/0192911 A1 | 9/2005 | Mattern | |
| 2006/0021848 A1 | 2/2006 | Smith | |
| 2006/0116972 A1 | 6/2006 | Wong | |
| 2006/0149684 A1 | 7/2006 | Matsuura et al. | |
| 2006/0152349 A1 * | 7/2006 | Ratnakar | G07B 15/00 340/426.1 |
| 2006/0267799 A1 | 11/2006 | Mendelson | |
| 2007/0016539 A1 | 1/2007 | Groft et al. | |
| 2007/0094153 A1 | 4/2007 | Ferrari | |
| 2007/0114849 A1 | 5/2007 | Falik et al. | |
| 2007/0119682 A1 | 5/2007 | Banks et al. | |
| 2007/0136128 A1 | 6/2007 | Janacek et al. | |
| 2007/0184852 A1 | 8/2007 | Johnson et al. | |
| 2007/0210935 A1 | 9/2007 | Yost et al. | |
| 2007/0285281 A1 | 12/2007 | Welch et al. | |
| 2008/0071611 A1 | 3/2008 | Lovett | |
| 2008/0093454 A1 | 4/2008 | Yamazaki et al. | |
| 2008/0147268 A1 | 6/2008 | Fuller | |
| 2008/0208680 A1 | 8/2008 | Cho | |
| 2008/0238715 A1 | 10/2008 | Cheng et al. | |
| 2008/0245638 A1 | 10/2008 | King et al. | |
| 2009/0026842 A1 | 1/2009 | Hunter et al. | |
| 2009/0032368 A1 | 2/2009 | Hunter et al. | |
| 2009/0095593 A1 | 4/2009 | King et al. | |
| 2009/0109062 A1 | 4/2009 | An | |
| 2009/0159674 A1 | 6/2009 | King et al. | |
| 2009/0183966 A1 | 7/2009 | King et al. | |
| 2009/0192950 A1 | 7/2009 | King et al. | |
| 2009/0267732 A1 | 10/2009 | Chauvin et al. | |
| 2009/0284907 A1 | 11/2009 | Regimbal et al. | |
| 2009/0315720 A1 | 12/2009 | Clement et al. | |
| 2010/0106517 A1 | 4/2010 | Kociubinski et al. | |
| 2010/0188932 A1 | 7/2010 | Hanks et al. | |
| 2010/0332394 A1 | 12/2010 | Ioli | |
| 2011/0057815 A1 | 3/2011 | King et al. | |
| 2011/0060653 A1 | 3/2011 | King et al. | |
| 2011/0203901 A1 | 8/2011 | King et al. | |
| 2011/0313822 A1 | 12/2011 | Burdick | |
| 2012/0158466 A1 | 6/2012 | John | |
| 2012/0285790 A1 | 11/2012 | Jones et al. | |
| 2012/0285792 A1 | 11/2012 | Jones et al. | |
| 2012/0285793 A1 | 11/2012 | Jones et al. | |
| 2013/0005445 A1 | 1/2013 | Walker et al. | |
| 2013/0027218 A1 | 1/2013 | Schwarz et al. | |
| 2013/0238406 A1 | 9/2013 | King et al. | |
| 2014/0040028 A1 | 2/2014 | King et al. | |
| 2014/0108107 A1 | 4/2014 | Jones et al. | |
| 2014/0129158 A1 | 5/2014 | Shea | |

(56) References Cited

U.S. PATENT DOCUMENTS

| | | | |
|---|---|---|---|
| 2014/0172518 | A1 | 6/2014 | King et al. |
| 2014/0174881 | A1 | 6/2014 | King et al. |
| 2014/0289025 | A1 | 9/2014 | King et al. |
| 2015/0084786 | A1 | 3/2015 | King et al. |
| 2015/0106172 | A1 | 4/2015 | Salama |
| 2015/0235503 | A1 | 8/2015 | King et al. |

FOREIGN PATENT DOCUMENTS

| | | |
|---|---|---|
| CA | 2363915 A1 | 5/2003 |
| EP | 0329129 A2 | 8/1989 |
| EP | 0980055 | 2/2000 |
| EP | 0980055 | 9/2001 |
| FR | 2837583 | 9/2003 |
| JP | 2002-099640 | 4/2002 |
| JP | 2005-267430 | 9/2005 |
| KR | 10-2005-0038077 | 4/2005 |
| WO | WO-2005-031494 | 4/2005 |
| WO | WO-2006-095352 | 9/2006 |
| WO | WO-2009-154787 | 12/2009 |

OTHER PUBLICATIONS

Co-pending U.S. Appl. No. 14/811,641, filed Jul. 28, 2015.
Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.
Petition for *Inter Partes* Review of U.S. Pat. No. 7,854,310. IPR Case No. IPR2016-00067, filed Oct. 22, 2015.
Petition for *Inter Partes* Review of U.S. Pat. No. 7,854,310. IPR Case No. IPR2016-00068, filed Oct. 22, 2015.
Petition for *Inter Partes* Review of U.S. Pat. No. 8,595,054. IPR Case No. IPR2016-00069, filed Oct. 22, 2015.
Tung. Design of an advanced on-street parking meter. RIT Scholar Works. Thesis/Dissertation Collections (2001).
U.S. Appl. No. 14/059,260, filed Oct. 21, 2013, King et al.
U.S. Appl. No. 14/185,691, filed Feb. 20, 2014, King et al.
U.S. Appl. No. 14/260,234, filed Apr. 23, 2014, King et al.
PCT/US2012/048190 International Search Report dated Jan. 22, 2013.
U.S. Appl. No. 13/786,387, filed Mar. 5, 2013, David William King, Unpublished.
Cell Net Data Systems, "First Wireless Monitoring of Parking Meters Results in Theft Arrests Using CellNet Data Systems Technology," PRNewswire, May 11, 1999, 2 pgs.
Flatley, "In San Francisco, Hackers Park for Free," Read filed under Misc. Gadgets, downloaded from www.engadget.com website on May 3, 2010, originally posted on Jul. 31, 2009, 5 pages.
Howland, S., "How M2M Maximizes Denver's Revenue," Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.
Meter Solutions, Single-Space Meters brochure, downloaded from www.duncansolutions.com website, revised Apr. 2006, 2 pages.
PCT/IB2006/054574 International Preliminary Report on Patentability dated Mar. 10, 2009.
PCT/IB2006/054574 International Search Report dated Oct. 27, 2008.
PCT/US2010/047906 International Preliminary Report on Patentability dated Mar. 6, 2012.
PCT/US2010/047906 International Search Report dated Mar. 30, 2011.
PCT/US2010/047907 International Preliminary Report on Patentability dated Mar. 15, 2012.
PCT/US2010/047907 International Search Report dated Apr. 26, 2011.
The U.S. Conference of Mayors Presents 'Best Practice' Awards, Los Angeles, New Orleans, Elizabeth, N.J. and Long Beach, CA Honored for Excellence & Innovation in Public-Private partnerships, Press Release Jan. 20, 2012.
Co-pending U.S. Appl. No. 14/979,104, filed Dec. 22, 2015.
U.S. Appl. No. 14/698,806 Office Action dated Dec. 14, 2015.
U.S. Appl. No. 14/811,641 Office Action dated Dec. 16, 2015.
Decision Denying Institution of *Inter Partes* Review dated Mar. 30, 2016 of U.S. Pat. No. 7,854,310. IPR Case No. IPR2016-00068.
Decision Denying *Inter Partes* Review dated Apr. 1, 2016 of U.S. Pat. No. 8,595,054. IPR Case No. IPR2016-00069.
Decision Denying *Inter Partes* Review dated Apr. 1, 2016 of U.S. Pat. No. 8,595,054. IPR Case No. IPR2016-00070.
Institution of *Inter Partes* Review dated Mar. 30, 2016 of U.S. Pat. No. 7,854,310. IPR Case No. IPR2016-00067.

* cited by examiner

POWER SUPPLY UNIT

CROSS-REFERENCE TO RELATED APPLICATIONS

This application is a continuation of U.S. patent application Ser. No. 12/059,909 filed Mar. 31, 2008 and issued as U.S. Pat. No. 8,513,832 on Aug. 20, 2013, which claims the benefit of U.S. Provisional Application No. 60/909,209, filed Mar. 30, 2007, each of which is incorporated in its entirety herein by reference.

FIELD OF THE INVENTION

THIS INVENTION relates to a power supply unit and to a device, in particular a single bay parking meter, having the power supply unit.

SUMMARY OF THE INVENTION

According to the invention, there is provided a power supply unit for supplying power to a device, the power supply unit including
  a rechargeable, main battery;
  a charging arrangement for charging the main battery;
  a set of connectors for connection to a back-up battery;
  a set of load terminals for connection to a load; and
  a control unit for controlling supply of power to the load primarily from the main battery and secondarily from the back-up battery.

In an embodiment of the invention the power supply unit has the main battery and the back-up battery. The back-up battery is preferably non-rechargeable.

It will be appreciated that power is taken, in use, from the backup battery in the event that the main battery is inadequate.

Further according to the invention there is provided a device, in particular a parking meter, which has a power supply unit in accordance with the invention.

In the event that the main battery runs low, the control unit is configured to supply power to the load from both the main battery and the back-up battery or only from the back-up battery.

In a preferred embodiment, the back-up battery is easily replaceable. In this embodiment, the power supply unit has a bay for receiving the back-up battery and the connectors are spaced and are such as to permit easy removal and replacement of the back-up battery.

In another embodiment of the invention, the power supply unit further includes a communication device, for communicating messages to a control system. Such messages are selected from the group consisting of: notification that the main battery has been insufficiently recharged, and a notification that power is being supplied from the backup battery.

In a further embodiment of the invention, the communication device may be operable in a wireless manner, and utilizes a cellular telephone network. Thus, with this embodiment, the communication device may have a cellular telephone module.

In an embodiment of the invention, the charging arrangement includes charging terminals for connecting the unit to a solar panel. The device then incorporates the solar panel.

It will be appreciated that in normal operation power is supplied only from the main battery. However, if the main battery is insufficiently recharged, or it is unable to supply the power required by the load, then supplementary power is supplied, partially or totally, from the backup battery, as determined by the control unit.

Preferably, the nominal supply voltage of the backup battery is slightly greater than that of the main battery.

BRIEF DESCRIPTION OF THE DRAWINGS

Embodiments of the invention is now described, by way of example only and without limiting the scope of the invention, with reference to the accompanying figures, wherein.

DETAILED DESCRIPTION

Figure 1:
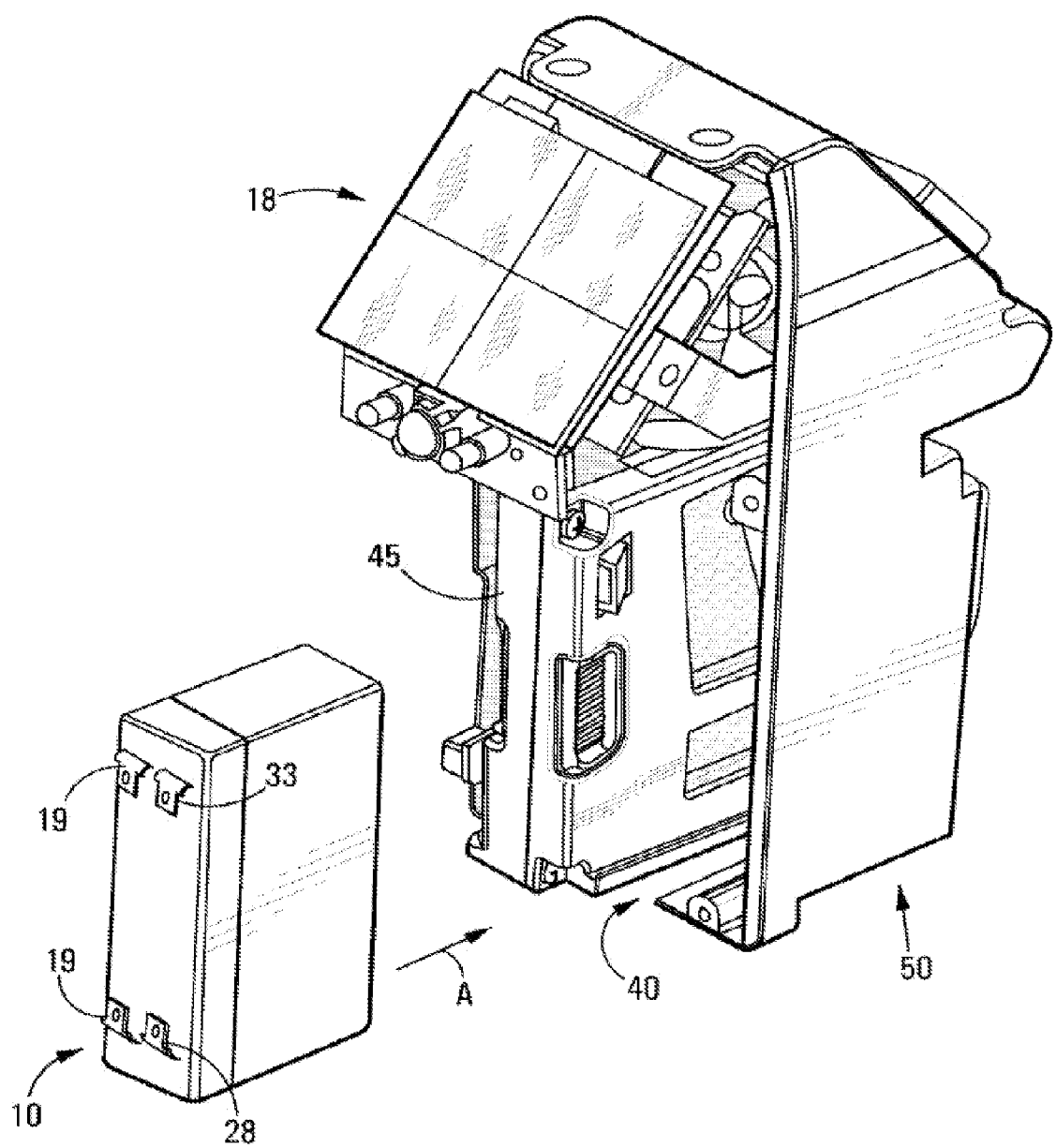
FIG. 1 is an isometric view of a power supply unit in accordance with the invention, shown in alignment with part of a parking meter body.

In the accompanying figures, the power supply unit is generally designated by reference numeral 10 and comprises a rechargeable, main battery 12, a charging arrangement in the form of a diode 34 for charging the main battery 12, a replaceable back-up battery 14, load terminals 19 and a control unit 16 for controlling supply of power to a load 20 connected via the load terminals 19 primarily from the main battery 12 and secondarily from the back-up battery 14 in the event that the main battery 12 is inadequate. The power supply unit 10 further has a solar panel terminal 33 and an auxiliary charging terminal 28.

Figure 3:
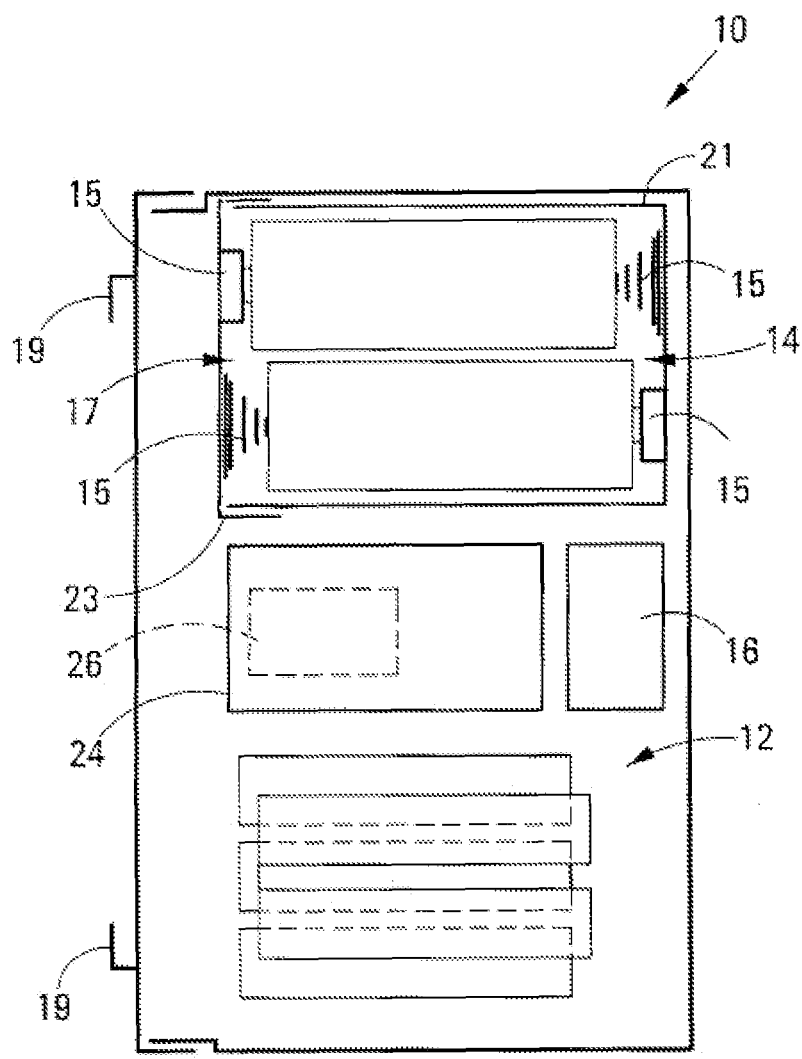
FIG. 3 is a schematic sectioned view of the power supply unit.
Figure 4:
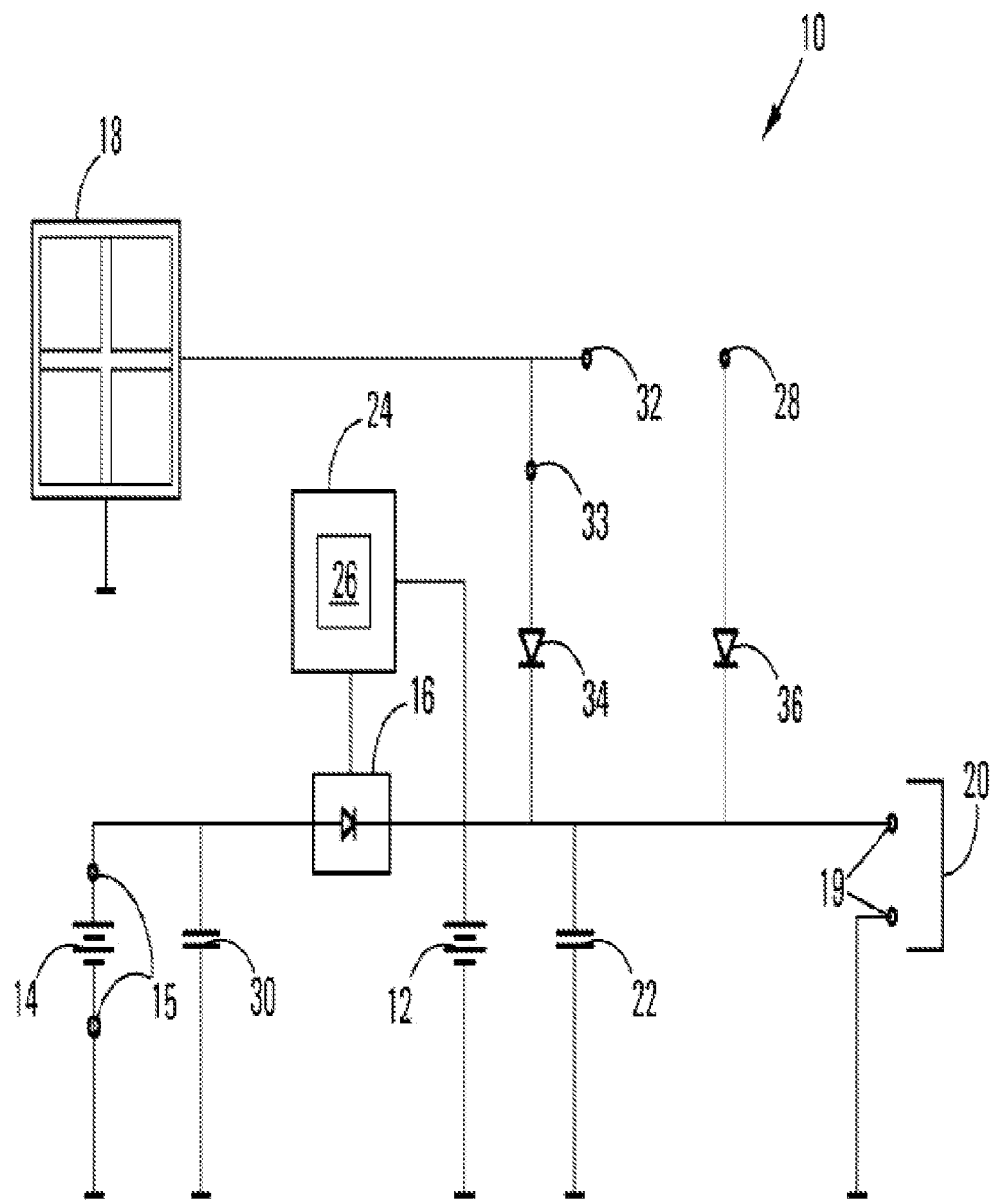
FIG. 4 is a circuit diagram of the power supply unit.

The power supply unit 10 further includes a bay 17 which contains the replaceable backup battery 14. The bay 17 is illustrated in FIG. 3, where it is seen to be defined by a compartment 21 with a lid 23 within the power supply unit 10. The bay 17 has spaced connectors 15 for the backup battery 14. Also shown in FIG. 3 is a communication device 24 with a cellular telephone module 26.

More specifically, in a preferred embodiment of the invention, the main battery 12 comprises an arrangement of five "AA" size nickel cadmium rechargeable cells, which cells are coupled to each other and recharged by solar panels 18 via the solar panel terminal 33. The backup battery 14 comprises a coupled arrangement of two non-rechargeable, disposable "C" size lithium-thionyl chloride cells, and the control unit 16 is a conventional linear, low dropout control unit, known in the trade as the Linear Technology™ model LT1529-5. The control unit 16 controls the supply of power to the load 20 from the main battery 12 and the backup battery 14, in the manner described below.

Figure 2:
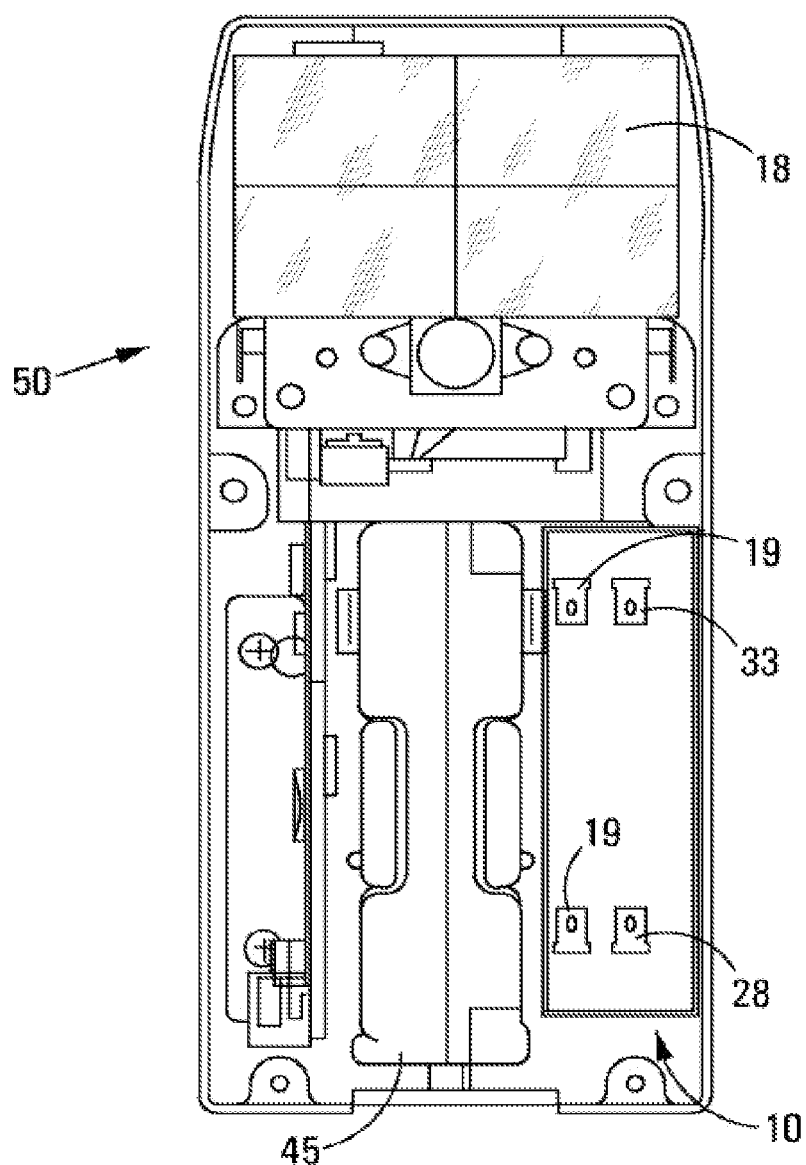
FIG. 2 is a rear view of the part of the parking meter body, depicting the power supply unit when inserted fully therein.

It is not only the power supply unit 10 itself that is the subject of this invention. This invention extends to include a device, in particular a single bay stand alone parking meter 50, having the power supply unit 10 as described above. This is illustrated in FIGS. 1 and 2, in which FIG. 1 depicts the power supply unit 10 aligned for insertion into a complementary dimensioned and configured recess 40 within parking meter 50. The power supply unit 10 is moved into position, in the direction of arrow "A," to fit snugly within the recess 40, as is depicted in FIG. 2. A coin validation unit 45 of the parking meter 50 is not a part of the present invention, but is mentioned for completeness, since the validation unit 45, and other components, such as a timer and a display (not shown) are powered by the power supply unit 10, being connected thereto via the load terminals 19. The parking meter 50 has the solar panels 18 which are connected to the solar panel terminal 33.

The power supply unit 10 is operated as follows. Under favorable conditions, with the main battery 12 being sufficiently charged and with the voltage across the main battery 12 being greater than a predetermined threshold value, the control unit 16 is configured to permit only the main battery 12 to supply power to the load 20. Conversely, under unfavorable conditions, when the main battery is not sufficiently charged, the supply voltage of the main battery 12 is lower than the threshold value, and in such conditions, the control unit 16 is configured to permit power to be supplied also, or only, from the backup battery 14 to the load. It will be appreciated that, in this way, use of the backup battery 14 occurs only when strictly necessary, namely when the voltage across the main battery 12 falls below a predetermined level.

In the particular instance where the power supply unit 10 is for a stand alone parking meter, the nominal supply voltage of the main battery 12 is 6.0V and of the back-up battery 14 7.2V. The control unit 16 is configured to permit power to be supplied from the backup battery 14 when the voltage across the main battery 12 measures 5.5 V or less.

Capacitor 30 is provided to assist during peak power demand and capacitor 22 assists with stability of the regulator 16 and with peak power demand. In alternative embodiments of the invention, a further, external recharging source, such as a portable charger, may be connected via terminal 28. It will be appreciated that the extent of reliance on the backup battery 14 to supply current to circuit 20, is minimized. This, in turn, extends the lifespan of the backup battery 14.

The power supply unit 10 further includes diodes 34 and 36, which serve to prevent reverse current from flowing into the solar panels 18 and an external auxiliary recharging source via terminal 28 respectively.

The communication device 24 communicates notifications to a control system (not shown). Typically, such notifications relate to the state of the main battery 12 and of the backup battery 14. Notifications that are communicated are that the voltage across the main battery 12 has fallen below the predetermined minimum level, and that power is being supplied from the backup battery 14. The communication device 24 communicates these notifications in a wireless manner across a telecommunications network via the cellular telephone module 26.

It will be appreciated by the person skilled in the art that application of this invention is not limited to parking meters only, but that this invention also has application to a multitude of power supply units used to supply current to electrical circuits.

What is claimed is:

1. A method for controlling the supply of power to a parking meter comprising:
   a) monitoring, by a control unit, a status of a main battery which is rechargeable and a back-up battery which is non-rechargeable;
   b) charging at least partially, by the control unit, the main battery via one or more charging sources;
   c) supplying power, by the control unit, to the parking meter primarily from the main battery;
   d) switching the supply of power, by the control unit, to come from the back-up battery when the voltage across the main battery falls below a predetermined level;
   e) supplementing the supply of power during a peak power demand, by the control unit, to the main battery by utilizing at least one capacitor; and
   f) signaling, by the control unit, a wireless communication device to communicate a status message to a control system external to the parking meter regarding the status of the main batter and the back-up battery;
   wherein the main battery, the back-up battery, the at least one capacitor, the wireless communication device, and the control unit are received within the parking meter.

2. The method of claim 1, wherein the parking meter further comprises a solar cell, and wherein the status message comprises one or more of: battery charge rate, remaining battery charge, remaining battery life, real-time current supplied by the solar cell, average current supplied by the solar cell, resistance at various sections within the power supply, error messages indicating battery failure, error messages indicating solar cell failure, real-time power consumption, and average power consumption.

3. The method of claim 1, wherein the status message is communicated over a telecommunications network.

4. The method of claim 1, further comprising switching the supply of power, by the control unit, back to the main battery when the main battery is sufficiently recharged.

5. The method of claim 4, further comprising minimizing the supply of power from the back-up battery after switching the supply of power to come from the main battery.

6. The method of claim 1, wherein the rechargeable main battery consists of one to five cells.

7. The method of claim 1, wherein the replaceable back-up battery consists of one to five cells.

8. The method of claim 1, wherein the at least one capacitor consists of two to five capacitors.

9. The method of claim 1, wherein the at least one capacitor comprises an ultra-capacitor.

10. The method of claim 1, wherein the at least one capacitor is in parallel with the main battery.

11. The method of claim 1, wherein a first capacitor is connected in parallel with the main battery to assist the main battery during the peak power demand, and a second capacitor is connected in parallel with the back-up battery to assist the back-up battery during the peak power demand.

12. The method of claim 1, wherein the peak power demand is during start up of the parking meter.

13. The method of claim 1, wherein the peak power demand is during start up of the wireless communications device.

14. The method of claim 1, wherein the parking meter further comprises a solar panel connected to the main battery.

15. The method of claim 14, wherein the main battery is recharged by the solar panel.

16. The method of claim 14, wherein the parking meter further comprises a diode coupled to the solar panel to prevent reverse current from flowing into the solar panel.

17. The method of claim 1, wherein the predetermined level is 5.5V.

18. A power supply for supplying power to a parking meter comprising:
   a) a main battery which is rechargeable;
   b) a charging arrangement comprising one or more terminals for connecting the main battery to one or more charging sources;
   c) a back-up battery which is replaceable and non-rechargeable;
   d) at least one capacitor;
   e) a connection to a wireless communication device for communicating a status message regarding the state of the main battery and the state of the back-up battery to a control system external to the parking meter; and f) a connection to a control unit for controlling supply of power to the parking meter primarily from the main battery and secondarily from the back-up battery, wherein the at least one capacitor assists during a peak power demand;

wherein the main battery, the back-up battery, the at least one capacitor, the wireless communication device, and the control unit are received within the parking meter.

19. The power supply of claim 18 further comprises a solar cell, wherein the wireless communication device communicates status messages to the control system, the status messages comprising one or more of: battery charge rate, remaining battery charge, remaining battery life, real-time current supplied by the solar cell, average current supplied by the solar cell, resistance at various sections within the power supply, error messages indicating battery failure, error messages indicating solar cell failure, real-time power consumption, and average power consumption.

20. The power supply of claim 18, further comprising a solar panel connected to the main battery.

21. The power supply of claim 20, wherein the main battery is recharged by the solar panel.

22. The power supply of claim 18, wherein the peak power demand is during start up of the parking meter.

23. The power supply of claim 18, wherein the peak power demand is during start up of the wireless communications device.

24. The power supply of claim 18, wherein the at least one capacitor comprises an ultra-capacitor.

* * * * *